United States Patent [19]

Leibhard et al.

[11] Patent Number: 4,656,806
[45] Date of Patent: Apr. 14, 1987

[54] EXPANSION ANCHOR ASSEMBLY

[75] Inventors: Erich Leibhard, Munich; Armin Herb, Peissenberg, both of Fed. Rep. of Germany

[73] Assignee: Hilti Aktiengesellschaft, Liechtenstein

[21] Appl. No.: 809,501

[22] Filed: Dec. 16, 1985

[30] Foreign Application Priority Data

Dec. 14, 1984 [DE] Fed. Rep. of Germany ....... 3445713

[51] Int. Cl.$^4$ .............................................. E04C 5/12
[52] U.S. Cl. ...................................... 52/704; 411/15; 411/44; 411/55
[58] Field of Search ...................... 52/704; 411/44, 15, 411/28, 55; 405/259, 261

[56] References Cited

U.S. PATENT DOCUMENTS

| 2,120,279 | 6/1938 | Hiers | 405/259 |
| 2,680,633 | 6/1954 | Brown | 52/704 |
| 2,842,999 | 7/1958 | Huston | 411/16 |
| 3,311,012 | 3/1967 | Williams | 411/15 |
| 4,516,378 | 5/1985 | Fischer | 52/704 |

FOREIGN PATENT DOCUMENTS

| 59825 | 9/1982 | European Pat. Off. | 411/44 |
| 2150572 | 4/1973 | Fed. Rep. of Germany | 411/55 |
| 2418205 | 11/1975 | Fed. Rep. of Germany | 52/704 |
| 1442292 | 7/1976 | United Kingdom | 411/44 |

Primary Examiner—William F. Pate, III
Assistant Examiner—Caroline D. Dennison
Attorney, Agent, or Firm—Toren, McGeady and Goldberg

[57] ABSTRACT

An expansion anchor assembly for use in a borehole formed in a receiving material has a leading end and a trailing end relative to the insertion direction of the assembly into the borehole. The expansion anchor assembly includes a tie rod with an expansion cone at its leading end, an expansion sleeve through which the tie rod extends and a cone sleeve positioned around the expansion cone and between the expansion cone and the leading end of the expansion sleeve. The radially outer surfaces of the expansion cone and the cone sleeve each have a different cone angle. Due to the different once angle, when the tie rod is drawn into the expansion sleeve toward the trailing end of the assembly, the part with the smaller cone angle moves in the same direction into the expansion sleeve until it contacts a stop. Subsequently on continued inward movement of the tie rod, both the expansion cone and the cone sleeve are drawn into the leading end of the expansion sleeve and effect an increased expanding action.

7 Claims, 8 Drawing Figures

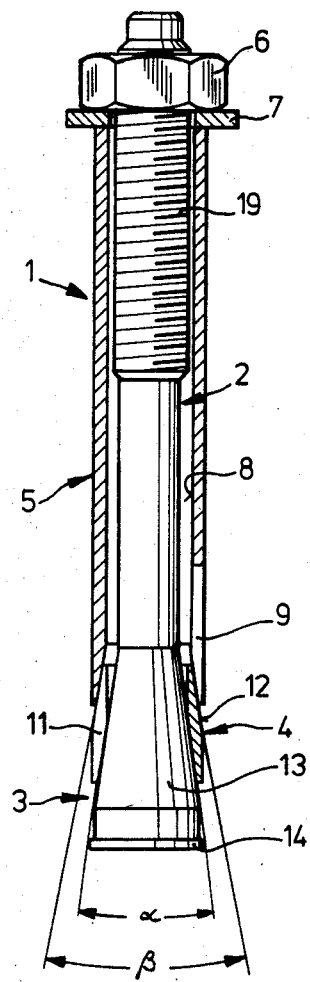
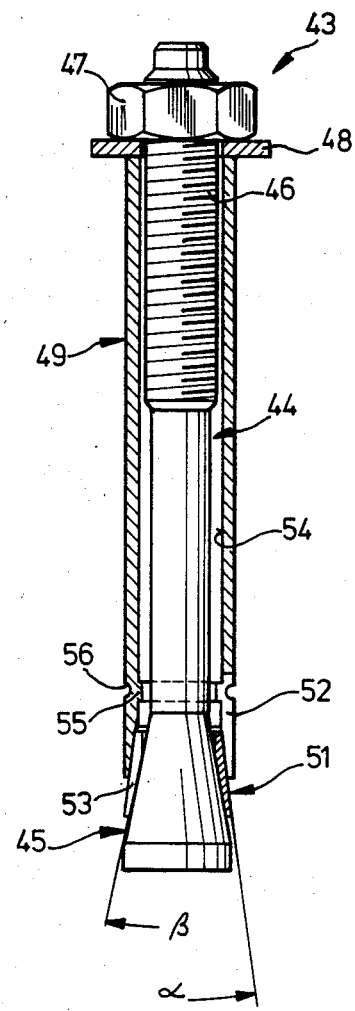

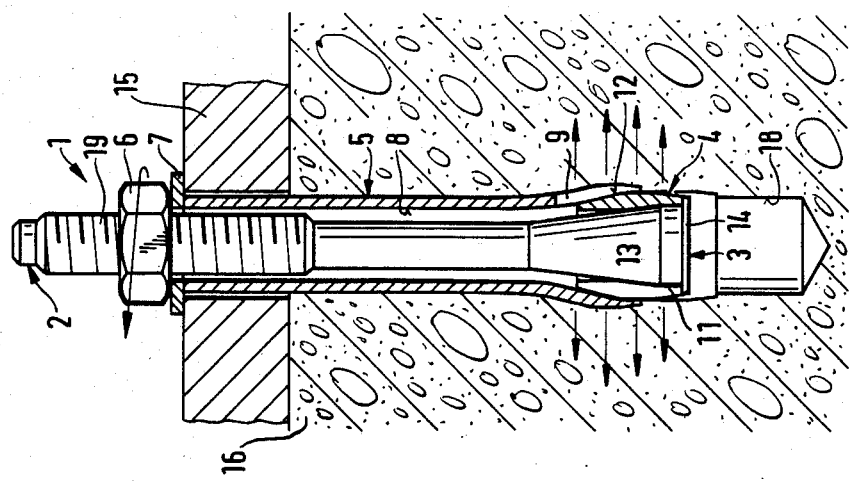
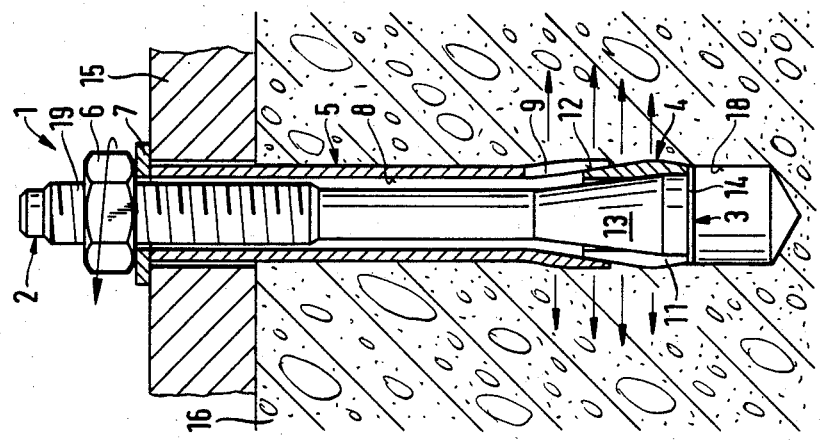
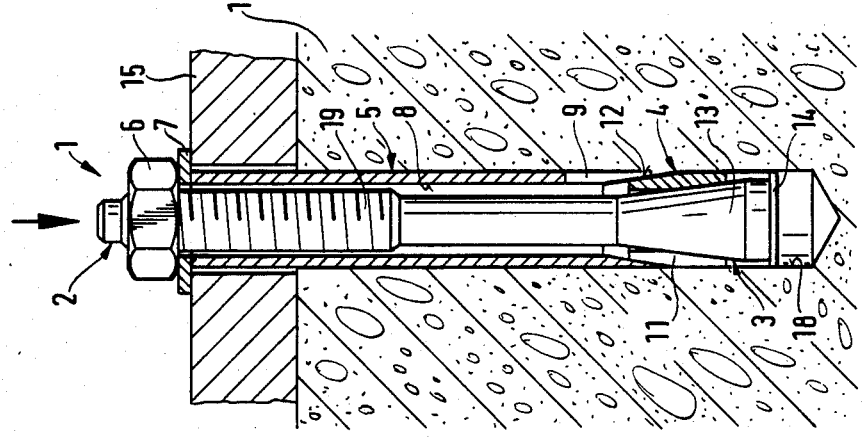

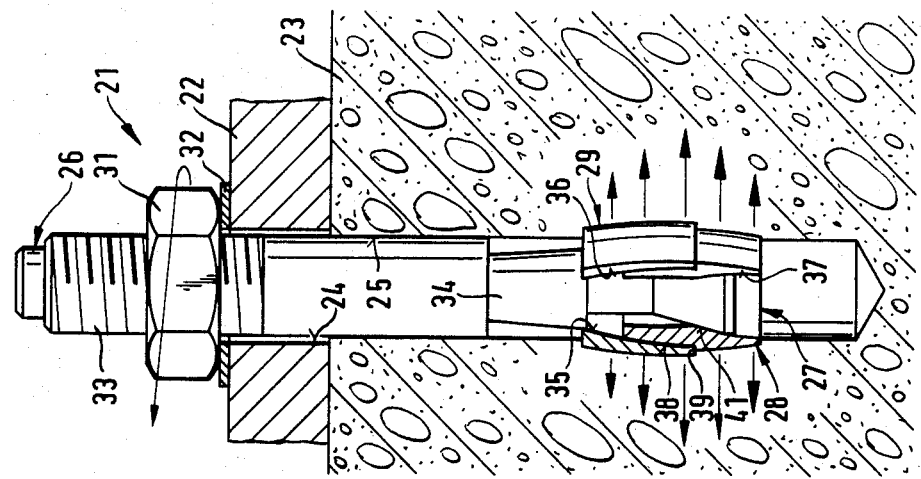
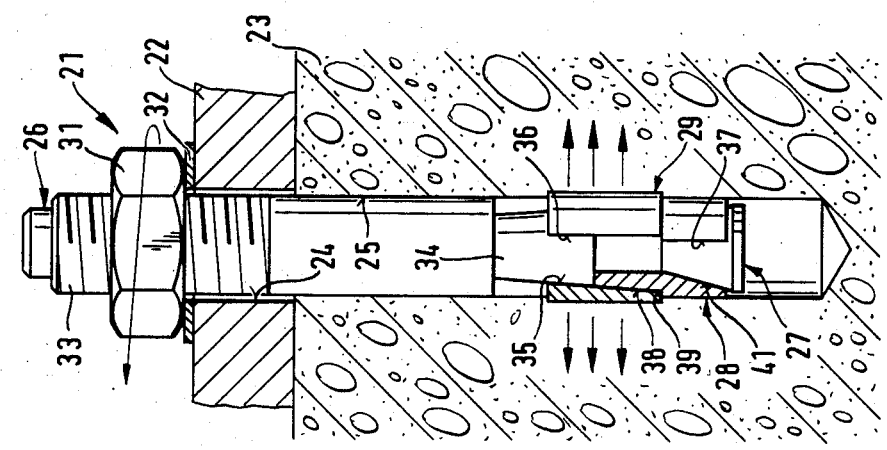
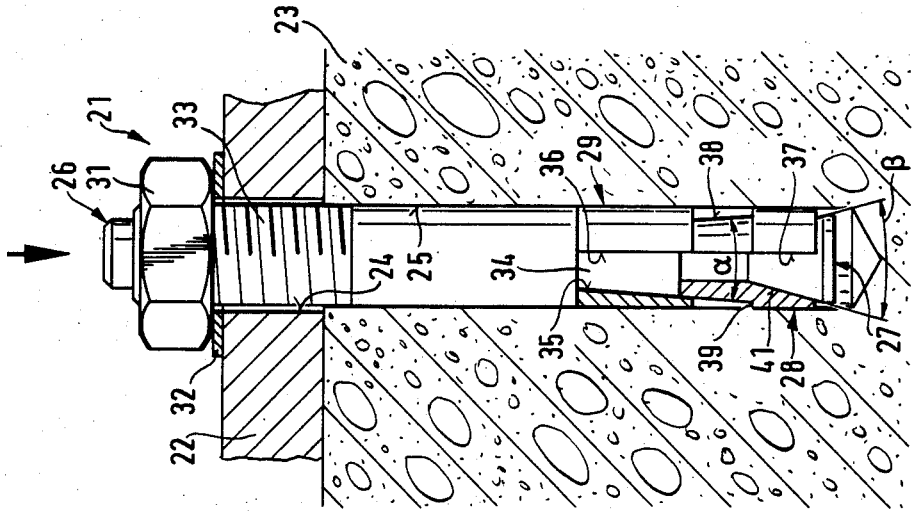

diameter of the radial projection preferably corresponds to the outside diameter of the expansion sleeve. As a result, it is not possible for the part of the anchor assembly which is contacted by the radial projection to extend away from the radial projection under tension conditions so that it is directed between the radial projection and the wall of the borehole into which the anchor assembly is placed.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 1 is an elevational view, partly in section, of an expansion anchor assembly embodying the present invention and displayed in the condition prior to expansion;

FIGS. 1a, 1b and 1c are views similar to FIG. 1 displaying various steps in securing the expansion anchor assembly in a borehole;

FIGS. 2a, 2b and 2c illustrate another embodiment of the present invention exhibiting the expansion anchor assembly in different conditions similar to that shown in FIGS. 1a, 1b and 1c; and FIG. 3 is still another embodiment of the present invention illustrating the expansion anchor assembly in a view similar to FIG. 1 with the assembly in the non-expanded condition.

DETAILED DESCRIPTION OF THE INVENTION

In FIG. 1 an expansion anchor assembly is shown having a leading end and a trailing end, that is, the leading end, the lower end in FIG. 1, is inserted first into a borehole with the trailing end accessible at the surface of the material into which the borehole is formed. Each of the parts of the assembly has a corresponding leading end and trailing end oriented in the same manner. The assembly includes an axially elongated tie rod 2 with an expansion cone 3 located at the leading end of the tie rod. A cone sleeve 4 laterally surrounds the expansion cone 3 and projects at its trailing end into the leading end of an expansion sleeve 5. The expansion sleeve 5 is axially elongated and laterally encloses the tie rod 2 from adjacent the trailing end of the rod to the junction of the rod with the expansion cone 3. A nut 6 is located on the trailing end of the tie rod 2 and bears against a washer 7 which projects radially outwardly beyond the outside diameter of the expansion sleeve 5. The washer 7 contacts the trailing end of the expansion sleeve 5 so that by tightening the nut on the tie rod against the washer 7, the tie rod 2 and the expansion cone 3 are drawn in the direction into the expansion sleeve opposite to the insertion direction of the expansion anchor assembly into a borehole.

At its leading end, the bore through the expansion sleeve has a section conically widening in the insertion direction of the assembly. To facilitate the expansion of the assembly, the expansion sleeve is provided with at least one axially extending slot 9 extending from the leading end of the sleeve toward the trailing end.

The axially extending cone sleeve 4 has an axially extending slot 11 extending between its leading and trailing ends and the radially outer surface of the cone sleeve has an axially extending conically shaped section 12 with a trailing end portion of the section extending into the conically shaped inside surface on the leading end of the expansion sleeve 5.

The expansion cone 3 has a conically shaped section 13 widening in the direction towards its leading end and the section 13 extends into the interior of the cone sleeve 4. The cone angle $\alpha$ of the expansion cone is smaller than the cone angle $\beta$ of the cone sleeve 4. A cylindrical projection extends from the leading end of the expansion cone 3 having the same diameter as the leading end of the expansion cone and terminates in the stop 14 projecting radially outwardly from the cylindrical portion.

As shown in FIGS. 1a, 1b and 1c the expansion anchor assembly 1 serves to secure an object 15 on the surface of a receiving material 16. The receiving material may be a concrete structure. To effect the securement of the object 15, the expansion anchor assembly, as shown in FIG. 1, is inserted through a borehole 17 formed in the object 15 into a borehole 18 formed in the receiving material 16 with the insertion direction being indicated by an arrow at the trailing end of the assembly. With the anchor assembly fully inserted, the washer 7 bears against the surface of the object 15 on the side spaced outwardly from the receiving material.

By screwing the nut 6 on a thread 19 formed on the trailing end of the tie rod 2, with the nut bearing against the washer 7, the tie rod is drawn or pulled from the expansion sleeve 5 counter to the insertion direction. The conical shaped section 13 on the expansion cone 3 moves the cone sleeve 4, since it has a smaller cone angle $\alpha$ less than the cone angle $\beta$ of the cone sleeve 4, so that the cone sleeve 4 is not displayed axially relative to the expansion sleeve 5. This displacement of the expansion cone 3 causes a radial expansion or widening of the cone sleeve 4 and, in turn, expands the leading end of the expansion sleeve 5 in the region where the expansion sleeve and the cone sleeve overlap. At the end of this part of the anchoring procedure, the stop 14 at the leading end of the tie rod, that is, forward of the cylindrical projection, contacts the leading end of the cone sleeve 4.

If the nut is screwed further onto the thread 19 the cone sleeve 4 is drawn more deeply into the expansion sleeve due to the stop 14, whereby the expansion sleeve 5 is widened over a longer axial portion so that the engagement of the expansion sleeve 5 in the borehole 18 in the receiving material 16 is achieved for ensuring a higher anchoring value, note FIG. 1c.

Another embodiment of the expansion anchor assembly 21 is displayed in FIGS. 2a, 2b and 2c and serves to secure an object 22 to the surface of a receiving material 23. The expansion anchor assembly is inserted through a hole or opening 24 in the object 22 into a borehole 25 formed in the receiving material 23.

The expansion anchor assembly 21 includes a tie rod 26 including an expansion cone 27 secured to the leading end of the tie rod. For securing the anchor within the borehole, the expansion cone is drawn into a cone sleeve 28 which partially extends into the leading end of an expansion sleeve 29. A nut is secured on the trailing end of the tie rod and bears over a washer 32 against the outer surface of the object 22 and assists in the displace-

EXPANSION ANCHOR ASSEMBLY

BACKGROUND OF THE INVENTION

The present invention is directed to an expansion anchor assembly for use in boreholes formed in a receiving material and the assembly includes an expansion sleeve, a tie rod with an expansion cone located on one end of the tie rod and with a cone sleeve positioned between the expansion cone and the expansion sleeve. For effecting the expanding action, the tie rod is pulled in the direction out of the borehole. The radially outer surface of the cone sleeve and the expansion cone each have a different cone angle.

Considerable expansion dimensions are required for expansion anchors used in tensile zone. In the past the attempt to use known anchors with an expansion sleeve, a cone sleeve and an expansion cone have not been effective. In such a known expansion anchor, the expanding process takes place as the expansion cone is drawn out of the borehole in the direction opposite to the insertion direction of the anchor. The expansion cone acts on the cone sleeve which moves into the expansion sleeve. After the cone sleeve is moved into the expansion sleeve and a first expansion of the expansion sleeve is effected, the expansion cone moves into the cone sleeve and causes an additional expansion of the expansion sleeve along with widening of the cone sleeve. This sequence of the expansion process is obtained with the cone sleeve having a smaller cone angle than the expansion cone.

A disadvantage of this known expansion anchor is that the cone sleeve moves into the expansion sleeve at various depths based on the strength or density of the receiving material, before the expansion cone takes effect. Particularly in receiving materials having great strength and with narrow boreholes, the cone sleeve moves into the expansion sleeve only slightly and effects a relatively slight expansion of the expansion sleeve. Subsequently, when the expansion cone is drawn into the cone sleeve, the cone sleeve is expanded only in the region projecting from the expansion sleeve with the result that no appreciable additional expansion of the expansion sleeve takes place. When employed in lower strength receiving material and in wider boreholes, less resistance is present against the movement of the cone sleeve so that it is completely drawn into the expansion sleeve without expansion of the cone sleeve resulting due to the movement of the expansion cone. Therefore, in both of the situations described, and especially when used in tensile zones subject to fracture, this known expansion anchor has a low expansion characteristic.

SUMMARY OF THE INVENTION

The primary object of the present invention is to provide an expansion dowel assembly distinguished in all of its applications by a high expansion characteristic.

In accordance with the present invention, a stop is provided which limits the movement, during expansion, of the expansion anchor assembly part having the smaller cone angle.

The part with the smaller cone angle can be either the cone sleeve or the expansion cone. Due to the different cone angles of the cone sleeve and the expansion cone, the one with the smaller cone angle produces a first expansion of the anchor by being displaced until a stop is contacted while it moves in the direction opposite to the direction in which the anchor assembly is inserted into the borehole. Subsequently, the assembly part with the larger cone angle is displaced opposite to the insertion direction and effects an additional expansion. The displacement path of the part with the smaller cone angle is independent of external conditions because of the stop and, therefore, always has the same dimensions.

In principle, it is possible to pull the tie rod in the direction out of the borehole by means of a nut located on the trailing end of the rod while securing a member onto the surface of the receiving material containing the borehole. During such a withdrawal step, the expansion cone moves oppositely to the insertion direction of the anchor assembly. It is also possible to form the tie rod as a cap screw so that as it is turned a threaded connection with the expansion cone moves the expansion cone in the direction opposite to the insertion direction.

Preferably, the stop is located in the leading end region of the expansion cone relative to the insertion direction. In such an arrangement, the expansion cone has the smaller cone angle and the stop can be located directly adjoining the leading end of the expansion cone, that is, its larger end. It is also possible to provide a cylindrical extension from the larger diameter end of the expansion cone with the end of the cylindrical extension spaced from the cone carrying the stop.

Preferably, the cone angle of the expansion cone is in the range of 12° to 14°, while the cone angle of the cone sleeve is in the range of 15° to 17°. To improve the movement of the expansion cone into the cone sleeve, the passageway through the cone sleeve is conically shaped at an angle corresponding to the cone angle of the expansion cone. The central bore through the expansion sleeve also has a conically shaped section widening in the insertion direction and corresponding to the cone angle of the cone sleeve.

In another embodiment of the present invention, the stop is located at the leading end of the conically shaped region of the cone sleeve. In this embodiment, a cone sleeve has a smaller cone angle. Accordingly, during the expansion procedure, the cone sleeve moves into the expansion sleeve until the stop contacts the expansion sleeve. Subsequently, the expansion cone moves into the cone sleeve and causes it to widen radially affording an additional expansion of the expansion sleeve. Preferably, the cone angle of the cone sleeve is in the range of 12° to 14° and the cone angle of the expansion cone is in the range of 15° to 17°.

Advantageously, the stop projects radially into the bore of the expansion sleeve. Such an arrangement is advisable if the cone sleeve has the smaller cone angle. The cone sleeve has a very simple shape in that no special means are required for the cooperation with the stop. To limit the path of movement of the cone sleeve the trailing end part of the cone sleeve engages the stop so that the expansion cone is drawn into the cone sleeve for effecting further expansion.

Preferably, the stop is formed as a radial projection or an annular-shoulder and formed monolithically with the respective assembly part. It is also possible, however, to employ a radially projecting securing ring inserted into a groove in the respective assembly part to form the radial projection.

To ensure a reliable engagement of the radial projection forming the stop after the movement of the part with the smaller cone angle, while very considerable tensile forces are developed in the tie rod, the outside ment of the tie rod 26 out of the borehole when the nut is tightened onto the rod.

A threaded section 33 is formed on the trailing end of the tie rod 26 onto which the nut 31 is screwed. In addition, the tie rod 6 has an axially extending conically shaped section 34 with the conical shape of the section 34 corresponding to the conical shape of a central bore through the expansion sleeve 29. Each of the expansion sleeve 29 and the cone sleeve 28 has at least one axially extending slot 36, 37 for facilitating the expansion of the sleeves. The cone sleeve 28 has an axially extending conically shaped section 38 extending from its trailing end toward its leading end with the section terminating toward the leading end in a radially outwardly projecting stop 39. The outside diameter of the stop corresponds to the outside diameter of the expansion sleeve 29. Expansion cone 27 has a conically shaped section 41 located within a correspondingly conically shaped section of the cone sleeve 28. The cone angle $\alpha$ of the cone sleeve 28 is smaller than the cone angle $\beta$ of the expansion cone 27. After the expansion anchor assembly 21 is inserted as shown in FIG. 2a, the tie rod 26 and its expansion cone 27 are drawn out of the borehole counter to the insertion direction, by tightening or screwing the nut onto the thread 33. The cone sleeve with the smaller cone angle $\alpha$ is then drawn further into the expansion sleeve 29 by the expansion cone 27 until the radially outwardly projecting stop or shoulder 39 contacts the leading end of the expansion sleeve 29. During this movement, the expansion sleeve 29 is spread radially outwardly against the wall of the borehole 25.

By continuing to screw the nut 31 onto the thread 33 on the tie rod 26, the expansion cone 27 moves further into the cone sleeve 28 which is supported against the expansion sleeve 29 with the result that the cone sleeve is radially widened and a further radial expansion of the expansion sleeve 29 takes place, as shown in FIG. 2c.

Another embodiment of the expansion anchor assembly 43 is displayed in FIG. 3 and includes a tie rod 44 with an expansion cone 45 formed on its leading end. A nut 47 is engaged on a thread 46 located at the trailing end of the tie rod 44. A washer 48 affords a support for the nut 47. The tie rod 46 extends axially through an axially elongated expansion sleeve 49 and a cone sleeve 51 fits into the leading end of the expansion sleeve. Each of the expansion sleeve 49 and the cone sleeve 51 has an axially extending slot 52, 53 to facilitate the expansion of these members. A stop 55 in the form of a radially inwardly directed projection is located within the bore 54 extending through the expansion sleeve 49 with the stop being located in the region of the slot 52 adjacent the trailing end of the slot which extends from the leading end toward the trailing end of the expansion sleeve. On the radially outer surface of the expansion sleeve 49, opposite the stop 55, there is an annular groove 56 for effecting a pivoting movement of the axially slotted leading end portions of the expansion sleeve for effecting its anchorage in the borehole. The bore 54 within the expansion sleeve has a conically shaped section at the leading end with the surface of the section widening to the leading end. This conically shaped section facilitates the movement of the cone sleeve 51 into the expansion sleeve 49.

The cone angle $\alpha$ of the cone sleeve 51 is smaller than the cone angle $\beta$ of the expansion cone 45. As a result, when the tie rod is pulled or drawn in the direction opposite to the insertion direction, initially the cone sleeve 51 moves into the expansion sleeve 49 until it contacts the stop 55 affording a first expansion of the axially slotted portion at the leading end of the expansion sleeve 49. Subsequently, the expansion cone 45 moves further into the axially fixed cone sleeve 51 and causes further radial widening which affords a further expansion of the expansion sleeve 49.

While specific embodiments of the invention have been shown and described in detail to illustrate the application of the inventive principles, it will be understood that the invention may be embodied otherwise without departing from such principles.

We claim:

1. Expansion anchor assembly for use in a borehole in a receiving material including an axially elongated expansion sleeve having a leading end and a trailing end relative to the insertion direction of the expansion anchor assembly into the borehole and said expansion sleeve having an axially extending bore between the leading and trailing ends thereof, the leading end of said expansion sleeve arranged to be expanded radially outwardly, an axially extending cone sleeve having a conically shaped outer surface and having a leading end and a trailing end relative to the insertion direction with said cone sleeve located at and arranged to be drawn into the leading end of said expansion sleeve, an axially elongated tie rod having a leading end and a trailing end relative to the insertion direction and extending axially through said expansion sleeve and with an expansion cone having a conically shaped radially outer surface secured to the leading end of said tie rod and located within and in surface contact with cone sleeve, means for drawing said expansion cone into said cone sleeve in the direction opposite to the insertion direction so that said expansion cone moves axially relative to said expansion sleeve towards the trailing end of said expansion sleeve, the radially outer surfaces of said cone sleeve and expansion cone each having a different cone angle and being axially displaceable into the leading end of said expansion sleeve by said means for drawing said expansion cone, and means forming a stop for limiting the axial movement of the one of said cone sleeve and expansion cone having the smaller cone angle after said means for drawing said expansion cone into said cone sleeve has effected a certain axial movement of said expansion cone relative to said expansion sleeve.

2. Expansion anchor assembly, as set forth in claim 1, wherein said stop is located adjacent the leading end of said expansion cone.

3. Expansion anchor assembly, as set forth in claim 1, wherein said stop is located at the leading end of said radially outer conically shaped surface of said cone sleeve.

4. Expansion anchor assembly, as set forth in claim 1, wherein said stop projects radially into the bore of the expansion sleeve adjacent the leading end thereof.

5. Expansion anchor assembly, as set forth in claim 1, wherein said stop projects radially.

6. Expansion anchor assembly, as set forth in claim 5, wherein said radially projecting stop projects radially outwardly and has an outside diameter corresponding substantially to the outside diameter of said expansion sleeve.

7. Expansion anchor assembly, as set forth in claim 2 or 3, wherein said stop projects radially.

* * * * *